United States Patent [19]

Marsland

[11] Patent Number: 4,557,645

[45] Date of Patent: Dec. 10, 1985

[54] TOOLING ATTACHMENT ADAPTOR ASSEMBLY

[75] Inventor: George H. Marsland, Bristol, Conn.

[73] Assignee: Colt Industries Operating Corporation, West Hartford, Conn.

[21] Appl. No.: 584,201

[22] Filed: Feb. 27, 1984

[51] Int. Cl.[4] .......................... B23C 5/26; B23C 7/00
[52] U.S. Cl. ................................... 409/144; 409/211; 409/215; 409/230
[58] Field of Search .............. 409/144, 215, 206, 207, 409/211, 231, 232, 233, 234, 236, 230; 83/499, 504

[56] References Cited

U.S. PATENT DOCUMENTS

| | | | |
|---|---|---|---|
| 3,507,507 | 4/1970 | Tobler et al. | 279/2 A |
| 3,540,346 | 11/1970 | Jones | 409/231 |
| 3,587,389 | 6/1971 | Kreimer | 409/144 X |
| 3,690,220 | 9/1972 | Escobedo | 409/215 X |
| 3,757,637 | 9/1973 | Eich et al. | 409/233 X |
| 3,851,364 | 12/1974 | Noa et al. | 409/231 X |

Primary Examiner—Z. R. Bilinsky

[57] ABSTRACT

An adaptor for a tooling attachment employs a hydraulically actuated sleeve clamp which secures an adaptor sleeve to the spindle housing of a machine tool, the attachment being affixed to the sleeve. A coupling assembly permits locking the adaptor sleeve at selected angular positions relative to the spindle housing, indexing of the sleeve being accomplished through the use of a pinion drive and an indexing gear. Indexing of the adaptor sleeve is permitted by a clamp mechanism which engages a circumferentially extending slot of the adaptor sleeve and which causes engagement and disengagement of the coupling assembly.

16 Claims, 1 Drawing Figure

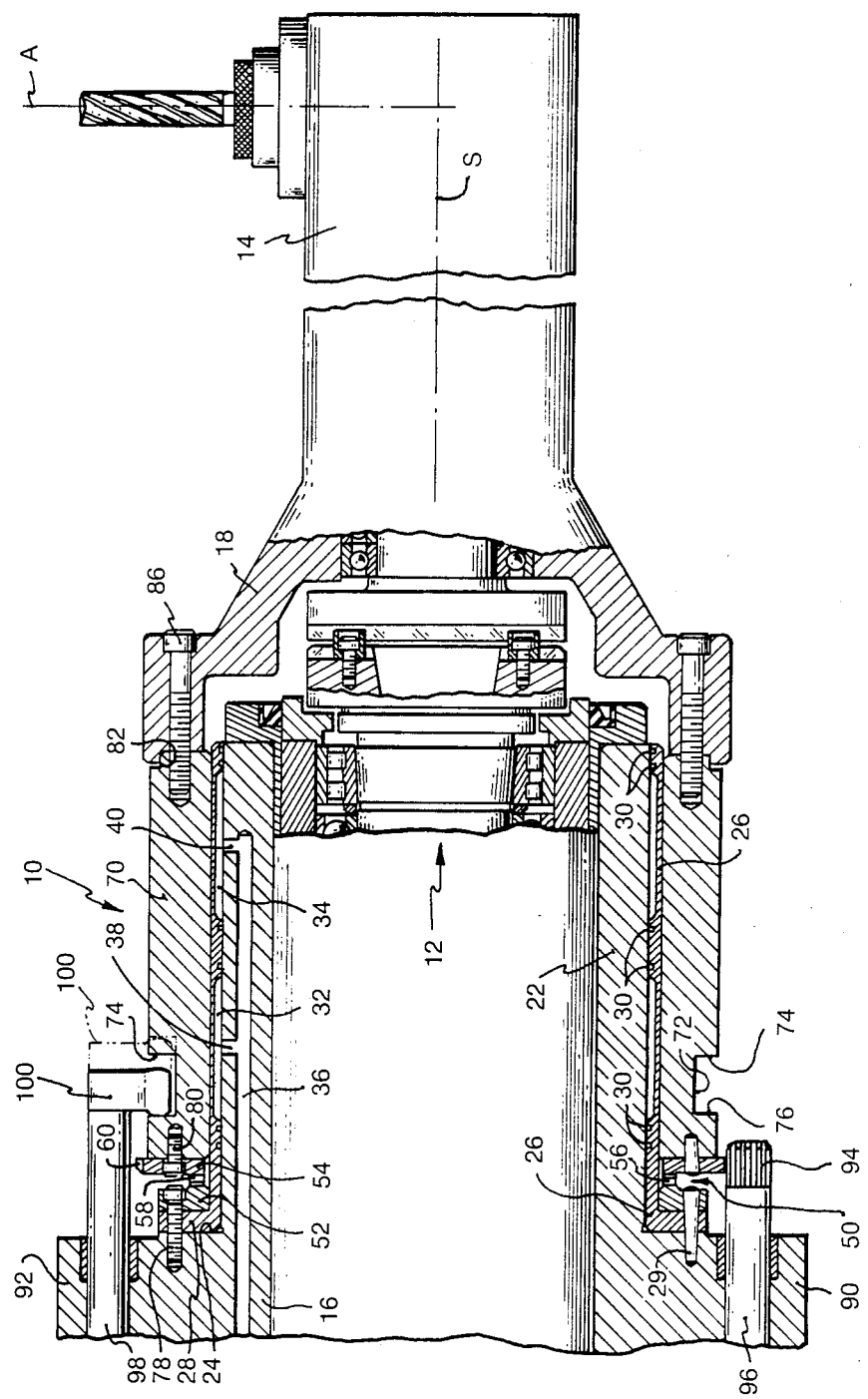

TOOLING ATTACHMENT ADAPTOR ASSEMBLY

BACKGROUND OF THE INVENTION

This invention relates to machining and especially to an adaptor assembly for a tooling attachment which is rotatably driven by a spindle assembly of a machine tool. More particularly, this invention relates to a new and improved method of and apparatus for angularly positioning and securing a tooling attachment to a machine tool spindle.

While not limited to use therewith, the present invention has utility in the coupling of a right-angle tooling attachment to the spindle of a machine tool. Right angle tooling attachments, wherein the rotational axis of the tooling element is oriented at a right angle to the drive axis of the machine base, are commonly employed in heavy-duty milling and machining operations. It is common for a set of removably interchangeable tooling attachments to be stored on a carousel. A selected tooling attachment is conventionally manually loaded, often with the aid of a hoist, onto a machine base and rotatably interlocked with a spindle assembly. This is a difficult and time-consuming task. The angular positioning of the tooling attachment relative to the workpiece typically must also be accomplished by manual means. The present invention is directed to providing a new and improved method and means for the loading, positioning, and securing of a tooling attachment to a rotary drive.

BRIEF SUMMARY OF THE INVENTION

Briefly stated, the invention in a preferred form is an adaptor assembly for a tooling attachment. The adaptor assembly comprises a spindle housing for enclosing a spindle assembly. An adaptor sleeve is received by the spindle housing. The adaptor sleeve includes a clamp engagement means. A hudraulically actuable sleeve clamp means secures the adaptor sleeve to the spindle housing. A face gear coupling means having a circumferential indexing gear mounts the adaptor sleeve at one end and selectively fixes the angular position of the adaptor sleeve relative to the spindle housing. An indexing means is engageable with the indexing gear to index the face gear coupling means for accurate angular positioning of the adaptor sleeve. A clamping means is engageable with the clamp engagement means to clamp the adaptor sleeve into coupling enagement with the coupling means. The opposite end of the adaptor sleeve includes a tooling attachment mounting means to mount a tooling attachment in fixed angular relationship to the adaptor sleeve.

The indexing means includes a pinion drive. The clamping means is a hydraulically actuable clamp which is engageable for coupling the engagement sleeve and for releasing the coupling means so that angular indexing of the coupling means may be accomplished. The hydraulically actuable clamp is also axially pivotal to permit removal of the adaptor sleeve from the spindle housing. The sleeve clamp means, in a preferred embodiment, includes a sleeve exteriorly mounted to the spindle housing and outwardly expandable to frictionally engage the interior of the adaptor sleeve. The face gear coupling means preferably includes a pair of complementary engageably face gears.

An object of the invention is to provide a new and improved adaptor assembly for a tooling attachment which facilitates the securing of a machining attachment to a rotatable drive.

Another object of the invention is to provide a new and improved adaptor assembly whereby a tooling attachment may be accurately angularly positioned by hydraulic means without the requirement of a hoist and/or a great amount of manual force and labor.

A further object of the invention is to provide a new and improved adaptor assembly for a tooling attachment which efficiently facilitates the mounting and dismounting of the tooling attachment from a spindle assembly.

Other objects and advantages of the invention will become apparent from the drawing and the specification.

BRIEF DESCRIPTION OF THE DRAWING

The drawing is a longitudinal cross-sectional view, partly broken away, of an adaptor assembly in accordance with the present invention.

DETAILED DESCRIPTION

With reference to the drawing, an adaptor assembly in accordance with the present invention is generally designated by the numeral 10. Assembly 10 is adapted for incorproation into a machining system of a type employing a machine tool which provides a rotational drive and which includes a spindle assembly, generally designated by the numeral 12. Spindle assembly 12 rotatably interlocks with a detachable tool holding attachment such as a right-angle tooling attachment of conventional form generally designated by the numeral 14. Spindle assembly 12 is, except for modifications described herein, of conventional design and cooperates with tooling attachment 14 to produce rotational drive about axis A. Axis A is generally perpendicular to the rotational drive axis S of spindle assembly 12. The above-described drive system may generally be viewed as housed in a spindle housing 16 and housing 18 of attachment 14. The specific forms which housings 16 and 18 take are not the subject of the present invention.

Spindle housing 16 encloses spindle assembly 12. Spindle housing 16 includes a forwardly disposed sleeve-like portion 22 extending longitudinally from an exterior transversely disposed circumferential shoulder 24. An expandable clamp sleeve 26 is positioned on and in contact with the exterior of spindle housing portion 22. Clamp sleeve 26 has a radially outwardly extending peripheral flange 28 which mates with and abuts against shoulder 24. A plurality of pins 29 secure clamp sleeve 26 to spindle housing 16. Clamp sleeve 26 and spindle housing 16 are coaxial and drive axis S.

The inwardly facing surface of clamp sleeve 26 is relieved to define a pair of annular longitudinally spaced expansion chambers 32 and 34 which each extend circumferentially in generally axially symmetric relationship to axis S. Spindle housing 16 further includes an axial bore 36 which functions as a hydraulic fluid conduit. Bore 36 communicates with radial bores 38 and 40. Radial bores 38 and 40 communicate with expansion chambers 32 and 34, respectively, to provide for the delivery of pressurized fluid from a source, not shown, to annular expansion chambers 32 and 34. The delivery of pressurized fluid to chambers 32 and 34 acts to expand clamp sleeve 26 radially outwardly. The source of the pressurized hydraulic fluid, including the control valves, may be of a conventional form which enables the selective supply of a pressurized hydraulic fluid to chambers 32 and 34 and the relief of the pressure when desired. Leakage of the fluid which causes the controlled expansion of sleeve clamp 26 is prevented by a plurality of seal rings 30 disposed between spindle extension 22 and sleeve clamp 26.

A coupling assembly, indicated generally at 50, includes a pair of generally annularly-shaped engagement plates 52 and 54 which are coaxial with axis S. Plate 52 is mounted on clamp sleeve 26 and abuts flange 28. Engagement plates 52 and 54 respectively include opposing complementary face gears 56 and 58. Face gears 56 and 58 are configured so that the engagement plates 52 and 54 may be relatively angularly adjusted relative to one another about axis S and angularly locked in a desired orientation by the meshing of face gears 56 and 58. In a preferred form of the invention, the face gears are formed to permit indexing in $1^0$ increments; i.e., to provide 360 discrete relative angular orientations between plates 52 and 54. Plate 54 also includes, in the disclosed embodiment, an integral circumferential radially projecting indexing gear having a plurality of teeth 60.

An adaptor sleeve 70 is interiorly dimensioned to be closely received around clamp sleeve 26. Adaptor sleeve 70 includes a peripheral circumferential slot 72 defined by the space between a pair of inwardly extending shoulders 74 and 76; these shoulders being transverse to axis S. Coupling assembly 50 is interposed between flange 28 of the clamp sleeve and a first end of adaptor sleeve 70. A plurality of bolts 78 extend through plate 52 and flange 28 into spindle housing 16 to secure engagement plate 52 in fixed angular position relative to spindle housing 16. A second plurality of bolts 80, threaded into the first end of the adaptor sleeve, secure engagement plate 54 in fixed angular postiion relative to adaptor sleeve 70. The second end of adaptor sleeve 70 has a circumferential shoulder 82 which radially mates with an annular cap-like portion of attachment housing 18. Adaptor sleeve 70 also includes, at the second end thereof, a plurality of angularly spaced threaded axial bores which receive bolts 86. Bolts 86 extend through housing 18 to mount rightangle tooling attachment 14 to sleeve 70.

A pair of generally diametrically located guides 90 and 92 project radially from spindle housing 16. Guide 90 receives a pinion shaft 96 having a pinion 94 which meshes with the outwardly facing teeth 60 of the indexing gear of the coupling assembly plate 54. Pinion shaft 96 is rotatably driven by mechanical or manual means, not illustrated, for rotatably driving pinion 94 to thereby index the angular position of engagement plate 54, and hence the angular position of adaptor sleeve 70 and attachment 14 relative to spindle housing 16.

Guide 92 receives a hydraulically driven clamp shaft 98 mounting a transversely extending clamp member 100. Clamp shaft 98 is adapted for reciprocation by hydraulic means so that clamp member 100 is selectively engageable against inwardly disposed shoulder 76 to cause axial locking of the adaptor sleeve 70 at the selected angular position as determined by the indexing of the coupling assembly 50. Extension of clamp shaft 98 results in clamp member 100 contacting shoulder rim 76 to drive sleeve 70 outwardly to thereby release the coupling engagement of the coupling assembly 50 by disengaging face gear 58 from face gear 56. This latter release allows the coupling assembly 50 to be indexed to a given axial position by pinion drive rotation of plate 54 about axis S. Clamp shaft 98 is also axially pivotal so that clamp member 100 may be withdrawn from slot 72 to thereby allow the adaptor sleeve 70 to be removed from the spindle assembly.

In operation, the adaptor assembly 10 provides an efficient means for securing a tooling attachment to a machine tool and for subsequent precise positioning of the attachment at a selected angular orientation about the axis S of the spindle assembly. After the tooling attachment 14 has been mounted to adaptor sleeve 70, the spindle assembly is inserted in sleeve 70. The sleeve 70 is then engaged by the spindle assembly by pressurizing the chambers 32 and 34. If indexing is desired, the pressure on the sleeve clamp 26 is relieved to allow the sleeve 70 and adaptor to be displaced by the extending of clamp shaft 98. By extending clamp shaft 98 to the position shown in phantom, adaptor sleeve 70 is displaced so that face gears 56 and 58 disengage. Plate 54 is now axially rotatable by the foregoing described pinion drive. Pinion shaft 96 is rotatably driven so that pinion 96 indexes the indexing gear to rotate plate 54 and hence adaptor sleeve 70 and tooling attachment 14 to the preselected angular position. The rotational position of pinion 94 may be monitored to provide position feed back information as part of a numerical control system. After the face gears are properly indexed, clamp shaft 98 is retracted to re-engage face gears 56 and 58, clamp member 100 bearing against shoulder 74 at this time. The hydraulic pressure in chambers 32 and 34 is then increased so that clamp sleeve 26 again frictionally engages the interior of adaptor sleeve 70. Tooling attachment 14 is carried by adaptor sleeve 70 in fixed angular relationship and is thus accurately positioned and securely clamped in the selected angular position dictated by the specific work or task to be accomplished. Other means for causing the coupling means 50 to be engaged and disengaged can, of course, be employed.

The tooling attachment may be reindexed by releasing the hydraulic pressure in the sleeve clamp 26, extending clamp shaft 98 as previously described, and reindexing the face gears by means of the pinion drive as previously described. Upon retraction of the clamp shaft 98 and the re-engagement of the clamp sleeve 26 against the adaptor sleeve 70, the tooling attachment is reindexed for a new tooling task. The adaptor sleeve may be removed from the spindle assembly by releasing the pressure within chambers 32 and 34, axially pivoting clamp member 100 out of slot 72 and axially removing the spindle assembly from the adaptor sleeve 70.

The foregoing adaptor assembly has been set forth for purposes of illustration and the foregoing description should not be deemed a limitation of the invention herein. Accordingly, various adaptions, modifications, and alternatives may occur to one skilled in the art without departing from the spirit and scope of the present invention.

What is claimed is:

1. An adaptor assembly for a tooling attachment for a machine tool, the machine tool including a spindle housing which at least in part encloses a spindle which is rotatable about an axis, said spindle housing including a sleeve which is co-axial with the axis of rotation of the spindle, the tooling attachment including a housing and a drive mechanism adapted to engage the spindle, said adaptor assembly comprising:

an adaptor sleeve, said adaptor sleeve having first and second oppositely disposed ends, said adaptor sleeve having an internal diameter which is greater than the external diameter of the spindle housing sleeve whereby said adaptor sleeve may be positioned coaxially with respect to the spindle housing sleeve;

means for releasably affixing the first end of said adaptor sleeve to the housing of the tooling attachment;

radially expandable sleeve clamp means for releasably coupling said adaptor sleeve intermediate the ends thereof to the spindle housing, said sleeve clamp means being positioned between said adaptor sleeve and the spindle housing sleeve when said adaptor assembly is mounted on a machine tool;

coupling means for selectively rigidly coupling the second end of said adaptor sleeve to the spindle housing, said coupling means permitting variation of the rotational position of said adaptor sleeve relative to the spindle housing when both of said sleeve clamp means and coupling means are in the unactuated state; and actuator means for causing engagement and disengagement of said coupling means.

2. The apparatus of claim 1 further comprising:

means for rotatably indexing said adaptor sleeve when said coupling means and sleeve clamp means are in the unactuated state.

3. The apparatus of claim 2 wherein said indexing means comprises:

indexing gear means affixed to said adaptor sleeve; and drive means for engaging said indexing gear.

4. The apparatus of claim 1 wherein said actuator means comprises:

a circumferentially extending slot in said adaptor sleeve; and reciprocal drive means, said drive means engaging said circumferential slot for moving said adaptor sleeve axially when said sleeve clamp means is in the unactuated state to selectively cause engagement and disengagement of said coupling means.

5. The apparatus of claim 3 wherein said actuator means comprises:

a circumferentially extending slot in said actuator sleeve; and reciprocal drive means, said drive means engaging said circumferential slot for moving said adaptor sleeve axially when said sleeve clamp means is in the unactuated state to selectively cause engagement and disengagement of said coupling means.

6. The apparatus of claim 1 wherein said coupling means comprises:

stationary gear means on the spindle housing, said gear means having an irregular face formed by gear teeth which defines a plane generally perpendicular to the axis of rotation of the spindle; and face gear means provided on said second end of said adaptor sleeve, said face gear means being adapted to engage said stationary gear means, said stationary gear means and face gear means cooperating to define preselected relative rotational orientations of said adaptor sleeve and the spindle housing.

7. The apparatus of claim 6 further comprising:

means for rotatably indexing said adaptor sleeve when said coupling means and sleeve clamp means are in the unactuated state.

8. The apparatus of claim 7 wherein said indexing means comprises:

indexing gear means affixed to said adaptor sleeve; and drive means for engaging said indexing gear.

9. The apparatus of claim 8 wherein said actuator means comprises:

a circumferentially extending slot in said adaptor sleeve; and reciprocal drive means, said drive means engaging said circumferential slot for moving said adaptor sleeve axially when said sleeve clamp means is in the unactuated state to selectively cause engagement and disengagement of said coupling means.

10. The apparatus of claim 9 wherein said reciprocal drive means may be selectively disengaged from said adaptor sleeve circumferential slot to permit removal of said adaptor sleeve from the spindle housing.

11. The apparatus of claim 1 wherein said sleeve clamp means is affixed to the spindle housing and is hydraulically expandable in the radial direction with respect to the axis of rotation of the spindle to frictionally engage the interior of said adaptor sleeve.

12. The apparatus of claim 11 wherein the spindle housing is provided with a supply conduit for pressurized hydraulic fluid, the supply conduit terminating in at least a first radially orientated discharge port, and wherein said sleeve clamp means defines at least a first fluid displacement chamber which communicates with the supply conduit in the spindle housing via the radial discharge port.

13. The apparatus of claim 12 wherein said actuator means comprises:

a circumferentially extending slot in said actuator sleeve; and reciprocal drive means, said drive means engaging said circumferential slot for moving said adaptor sleeve axially when said sleeve clamp means is in the unactuated state to selectively cause engagement and disengagement of said coupling means.

14. The apparatus of claim 13 wherein said releasable coupling means comprises:

stationary gear means on the spindle housing, said gear means having an irregular face formed by gear teeth which defines a plane generally perpendicular to the axis of rotation of the spindle; and face gear means provided on said second end of said adaptor sleeve, said face gear means being adapted to engage said stationary gear means, said stationary gear means and face gear means cooperating to define preselected relative rotational orientations of said adaptor sleeve and the spindle housing.

15. The apparatus of claim 14 further comprising:

means for rotatably indexing said adaptor sleeve when said coupling means and sleeve clamp means are in the unactuated state.

16. The apparatus of claim 15 wherein said indexing means comprises:

indexing gear means affixed to said adaptor sleeve; and drive means for engaging said indexing gear.

* * * * *